(12) United States Patent
Sun et al.

(10) Patent No.: US 9,250,726 B2
(45) Date of Patent: Feb. 2, 2016

(54) TOUCH DISPLAY AND ELECTRONIC APPARATUS

(71) Applicant: BOE TECHNOLOGY GROUP CO., LTD., Beijing (CN)

(72) Inventors: Hongda Sun, Beijing (CN); Junwei Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 65 days.

(21) Appl. No.: 13/703,559

(22) PCT Filed: Oct. 11, 2012

(86) PCT No.: PCT/CN2012/082788
§ 371 (c)(1),
(2) Date: Dec. 11, 2012

(87) PCT Pub. No.: WO2013/091434
PCT Pub. Date: Jun. 27, 2013

(65) Prior Publication Data
US 2013/0162560 A1    Jun. 27, 2013

(30) Foreign Application Priority Data
Dec. 23, 2011    (CN) .................... 2011 2 0548632 U

(51) Int. Cl.
*G06F 3/00* (2006.01)
*G06F 3/041* (2006.01)

(52) U.S. Cl.
CPC .............. *G06F 3/041* (2013.01); *G06F 3/0418* (2013.01); *G06F 2203/04107* (2013.01)

(58) Field of Classification Search
CPC ....................................................... G06F 3/041
USPC ............................................................ 345/174
See application file for complete search history.

(56) References Cited

U.S. PATENT DOCUMENTS

2009/0102763 A1*  4/2009  Border et al. .................. 345/87
2009/0183931 A1   7/2009  Okano et al.
(Continued)

FOREIGN PATENT DOCUMENTS

CN     101493741 A    7/2009
CN     201352340 Y    11/2009
(Continued)

OTHER PUBLICATIONS

International Search Report mailed Jan. 24, 2013; PCT/CN2012/082788.

(Continued)

*Primary Examiner* — Amare Mengistu
*Assistant Examiner* — Joseph G Rodriguez
(74) *Attorney, Agent, or Firm* — Ladas & Parry LLP

(57) ABSTRACT

Embodiments of the present invention provide a touch display and an electronic apparatus. The touch display comprises a display device; a touch device, positioned on a display surface side of the display device, and the touch device comprising a touch-sensitive layer; a shielding circuit layer, disposed between the touch-sensitive layer and the display device; and a transparent insulating layer, disposed between the touch-sensitive layer and the shielding circuit layer, wherein the shielding circuit layer and the touch-sensitive layer are equipotential. The electronic apparatus comprises the touch display.

7 Claims, 3 Drawing Sheets

(56) References Cited

U.S. PATENT DOCUMENTS

| | | | |
|---|---|---|---|
| 2011/0007021 A1* | 1/2011 | Bernstein et al. | 345/174 |
| 2011/0080373 A1* | 4/2011 | Wang et al. | 345/174 |
| 2011/0227867 A1 | 9/2011 | Ogawa et al. | |

FOREIGN PATENT DOCUMENTS

| | | |
|---|---|---|
| CN | 102193680 A | 9/2011 |
| CN | 202372727 U | 8/2012 |
| GB | 2456312 A | 7/2009 |
| WO | 2011/005977 A2 | 1/2011 |

OTHER PUBLICATIONS

International Preliminary Report on Patentability Issued Jun. 24, 2014 Appl. No. PCT/CN2012/082788.

Korean Examination Opinion dated Oct. 31, 2014; Appl. No. 10-2012-7030635.

Korean Notice of Allowance dated Apr. 30, 2015; Appln. No. 10-2012-7030635.

Extended European Search Report dated Feb. 7, 2015; 12791674.0-1904/2808727 PCT/CN2012082788.

* cited by examiner

TOUCH DISPLAY AND ELECTRONIC APPARATUS

CROSS REFERENCE TO RELATED APPLICATIONS

This application is a national stage application under 35 U.S.C. 371 and claims the benefit of PCT Application No. PCT/CN2012/082788 having an international filing date of Oct. 11, 2012, which designated the United States, which PCT application claimed the benefit of Chinese Application No. 201120548632.3 filed Dec. 23, 2011, the disclosure of each of which are incorporated herein by reference.

TECHNICAL FIELD

Embodiments of the present invention relate to a touch display and an electronic apparatus comprising the touch display.

BACKGROUND

Touch screens can be divided into various types, such as resistive type, capacitive type, surface infrared type, acoustic wave type and the like. A touch display may be formed by attaching one layer of special metallic conductive material (touch-sensitive layer) on a surface of a glass. When a finger touches on the metallic layer, a capacity on the touching point changes, which makes a frequency of an oscillator connected to the metallic layer change. Information on the touch position may be obtained by measuring change of the frequency. In a capacitive touch screen of on cell type which is produced on the basis of a Liquid Crystal Display (LCD), a grounded shielding circuit layer of Indium Tin Oxide (ITO) will be disposed between a touch-sensitive layer and a display device. When an electrical signal is introduced to the touch-sensitive layer (TP sensor) part, the touch-sensitive layer will form a coupled capacity with the ITO shielding circuit layer and produce a phenomenon of charge-discharge, so that a capacity of the touch-sensitive layer is influenced and an abnormal operation is caused.

SUMMARY

One embodiment of the present invention provides a touch display, comprising: a display device; a touch device, positioned on the display surface side of the display device, and the touch device comprising a touch-sensitive layer; a shielding circuit layer, disposed between the touch-sensitive layer and the display device; and a transparent insulating layer, disposed between the touch-sensitive layer and the shielding circuit layer, wherein the shielding circuit layer and the touch-sensitive layer are equipotential.

Another embodiment of the present invention provides an electronic apparatus, and the electronic apparatus comprises the touch display according to any embodiment of the present invention.

BRIEF DESCRIPTION OF THE DRAWINGS

To illustrate technical solutions in embodiments of the present invention more clearly, accompanied drawings of the embodiments will be briefly introduced below. Obviously, the accompanied drawings described below merely relate to some embodiments of the present invention, and are not limitation on the present invention.

DETAILED DESCRIPTION

In order to make objects, technical details and advantages of the embodiments of the invention apparent, hereinafter, technical solutions in embodiments of the present invention will be clearly and fully described in combination with the accompanied drawings in the embodiments of the present invention. Apparently, the embodiments to be described are merely a part but not all of embodiments of the present invention. Every other embodiment as would be obvious to those ordinarily skilled in the art on the basis of described embodiments in the present invention without creative work, comes within the protection scope of the present invention.

Figure 1:
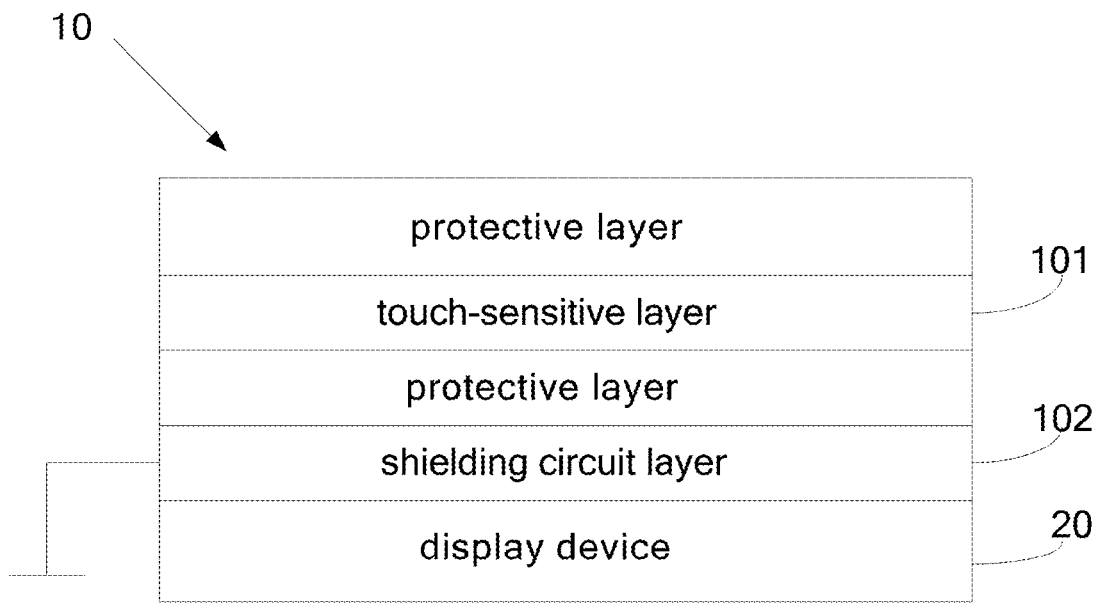
FIG. 1 is a structural diagram of a touch display in the prior art.

FIG. 1 shows a structure of a touch display 10 in the prior art, in which a touch-sensitive layer 101 and a shielding circuit layer 102 positioned above a display device 20 are insulated from each other, and the shielding circuit layer 102 is grounded.

Figure 2:
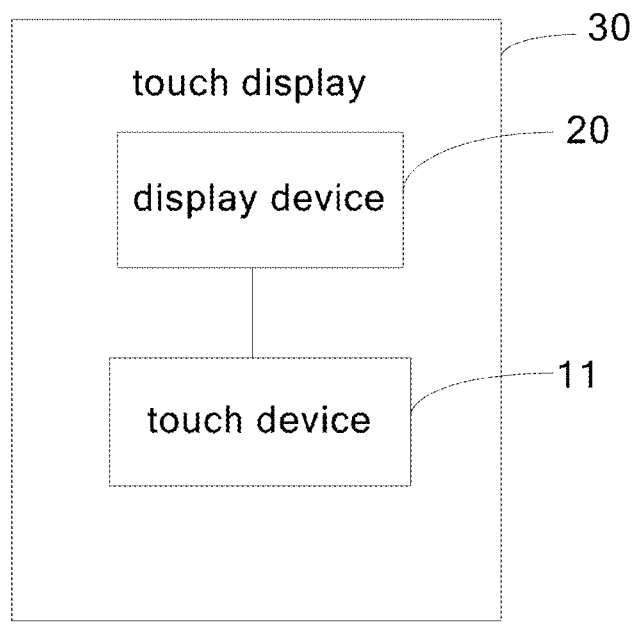
FIG. 2 is a block diagram showing components of a touch display provided by an embodiment of the present invention.
Figure 3:
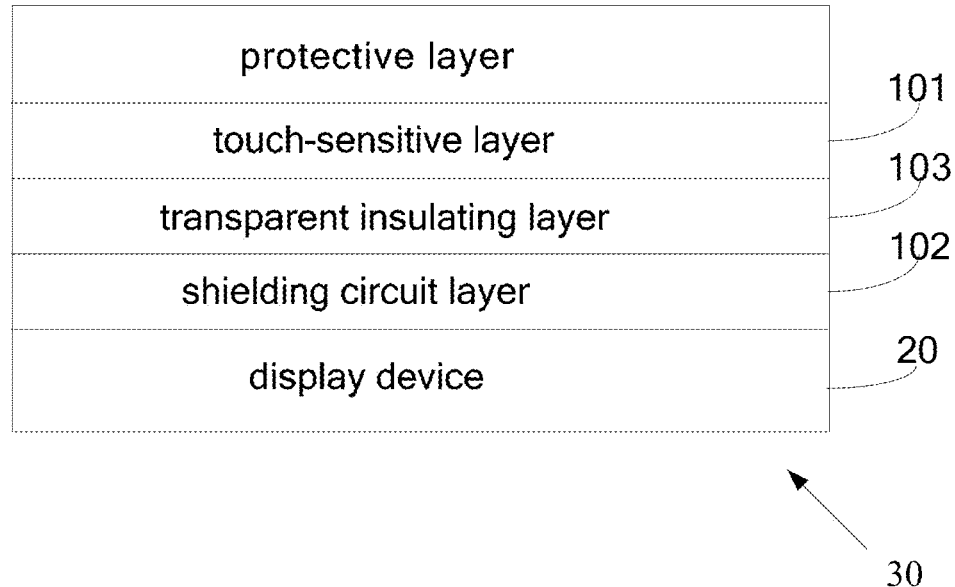
FIG. 3 is a structural diagram of a touch display provided by an embodiment of the present invention.

A touch display 30 provided by an embodiment of the present invention, as shown in FIG. 2, comprises a display device 20 and a touch device (touch detection device) 11. As shown in FIG. 3, the touch device 11 is positioned above the display device 20, i.e., the touch device 11 is positioned on a display surface side of the display device 20. The touch device 11 comprises a touch-sensitive layer 101, and a shielding circuit layer 102 is disposed between the touch-sensitive layer 101 and the display device 20. A transparent insulating layer 103 is disposed between the touch-sensitive layer 101 and the shielding circuit layer 102, and the shielding circuit layer 102 and the touch-sensitive layer 101 are equipotential. A protective layer (not shown in FIG. 2) may be disposed on the touch-sensitive layer 101 for avoiding the touch-sensitive layer 101 to be scratched.

In one embodiment, the shielding circuit layer 102 and the touch-sensitive layer 101 being equipotential may be achieved by electrically connecting the shielding circuit layer 102 with the touch-sensitive layer 101. For example, the shielding circuit layer 102 and the touch-sensitive layer 101 may be electrically connected with each other by a Via penetrating the transparent insulating layer 103.

In this case, the shielding circuit layer of the touch display is not grounded, and is equipotential with the touch-sensitive layer, without potential difference between them, so that formation of a coupled capacity between the touch-sensitive layer and the shielding circuit layer is avoided and the touch-sensitive layer is enabled to work normally.

In one embodiment, the touch-sensitive layer and the shielding circuit layer may be transparent conductive layers. Hence information shown on the display device may be seen through the touch-sensitive layer and the shielding circuit layer. For example, the transparent conductive layer may be a layer of metallic oxide, such as a layer of Indium Tin Oxide (ITO), a layer of Indium Zinc Oxide (IZO) and the like.

Figure 4:
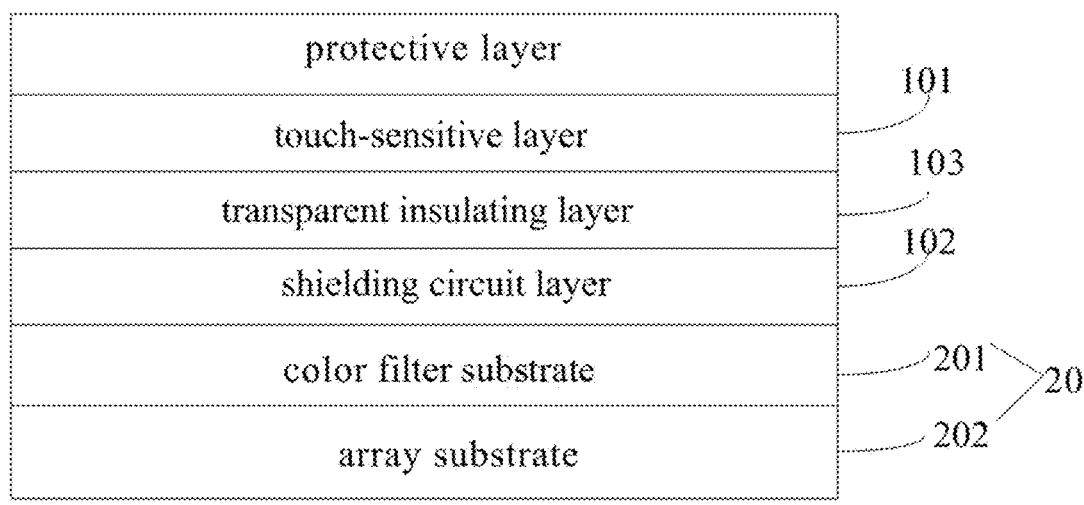
FIG. 4 is a structural diagram of a touch display provided by an embodiment of the present invention.

In one embodiment, as shown in FIG. 4, the display device 20 may comprise an array substrate 202 and a counter substrate 201, and the touch-sensitive layer 101, the shielding circuit layer 102 and the transparent insulating layer 103 are disposed on the counter substrate 201. For example, the display device 20 may be a liquid crystal display panel, an Organic Lighting Emitting Diode (OLED) display panel, or any type of other suitable display panel. When the display device 20 is a liquid crystal display panel, the counter substrate 201 may be a color filter substrate.

Figure 5:
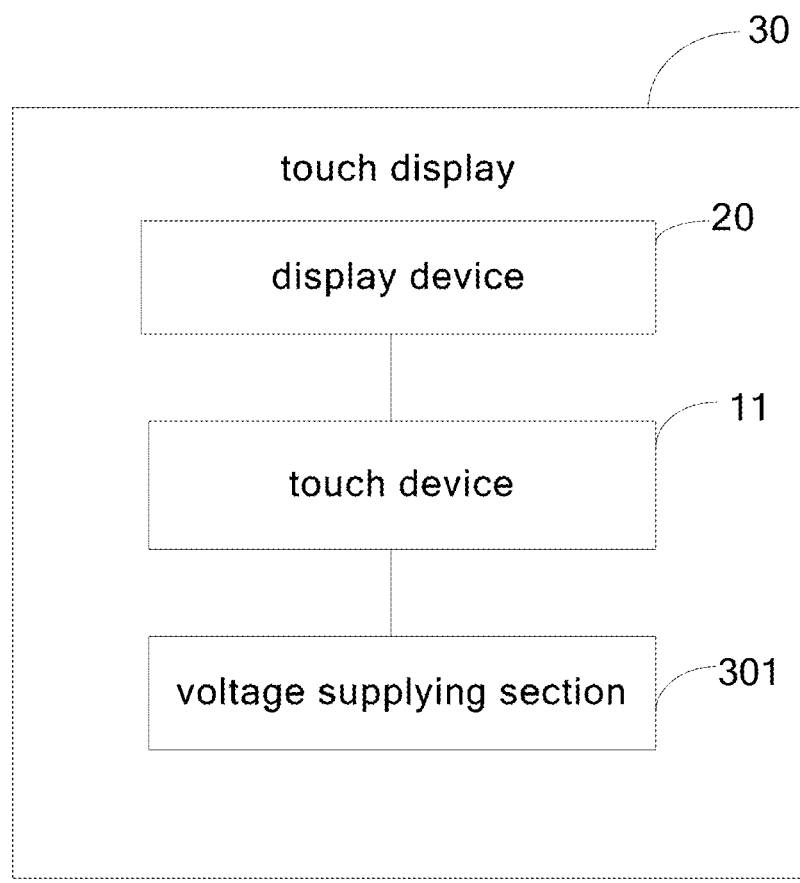
FIG. 5 is a structural diagram of another touch display provided by an embodiment of the present invention.

In one embodiment, as shown in FIG. 5, the touch display 30 may further comprise a voltage supplying section 301 which is connected with the shielding circuit layer and the touch-sensitive layer of the touch device 11 (not shown in FIG. 5) for supplying the same voltage for the shielding circuit layer and the touch-sensitive layer.

The voltage supplying section supplies the same voltage for the shielding circuit layer in the touch display and the touch-sensitive layer, and in this case, the shielding circuit layer is not grounded, and is loaded with the same voltage with the touch-sensitive layer, without potential difference between them, thus formation of a coupled capacity between the touch-sensitive layer and the shielding circuit layer in the touch display is avoided and the touch-sensitive layer is enabled to work normally.

Figure 6:
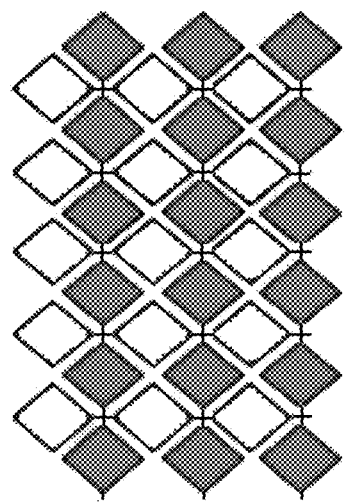
FIG. 6 is an exemplary structure of a touch-sensitive layer according to an embodiment of the present invention.

Besides the touch-sensitive layer 101, the touch device 11 in the above-mentioned touch display may also comprise any other suitable components. The touch-sensitive layer 101 may also adopt any known structure. For example, the touch-sensitive layer 101 may have the structure shown in FIG. 6. As shown in FIG. 6, the touch-sensitive layer 101 consists of first sensitive patterns denoted by diamonds filled with gray and second sensitive patterns denoted by diamonds filled with white. The first sensitive patterns are connected with each other by connection lines along the column direction, and the second sensitive patterns are connected with each other by connection lines along the row direction. Further, although it seems from the figures that the connection lines of the first sensitive patterns and the connection lines of the second sensitive patterns are crossed with each other, they are electrically insulated actually. Therefore, a touch position may be determined by detecting a capacity change of the sensitive patterns along the row direction and that of the sensitive patterns along the column direction. However, the specific structure mentioned above is just an exemplary structure, and the touch sensitive layer according to the embodiments of the present invention may have any suitable structure.

In addition, the present invention also provides an electronic apparatus, which comprises a touch display according to any embodiment of the present invention. For example, the electronic apparatus may be a mobile telephone, a tablet computer, a digital still camera, a video camera, a navigator and the like.

In the electronic apparatus, since the shielding circuit layer and the touch-sensitive layer in the touch display are equipotential, formation of a coupled capacity between the touch-sensitive layer and the shielding circuit layer in the touch display is avoided and the touch-sensitive layer is enabled to work normally.

According to the description of the above-mentioned embodiments, the embodiments of the present invention may provide at least the following structure:

(1) A touch display, comprises:
a display device;
a touch device, positioned on a display surface side of the display device, and the touch display comprising a touch-sensitive layer;
a shielding circuit layer, disposed between the touch-sensitive layer and the display device; and
a transparent insulating layer, dispose between the touch-sensitive layer and the shielding circuit layer,
wherein the shielding circuit layer and the touch-sensitive layer are equipotential.

(2) The touch display according to (1), wherein the shielding circuit layer and the touch-sensitive layer are electrically connected with each other.

(3) The touch display according to (1) or (2), wherein the touch-sensitive layer and the shielding circuit layer are transparent conductive layers.

(4) The touch display according to any of (1)-(3), wherein the transparent conductive layers are indium tin oxide layers or indium zinc oxide layers.

(5) The touch display according to any of (1)-(4), wherein the display device comprises a counter substrate and an array substrate, and the touch-sensitive layer, the shielding circuit layer and the transparent insulating layer are disposed on the counter substrate.

(6) The touch display according to any of (1)-(5), wherein the display device is a liquid crystal display panel, and the counter substrate is a color filter substrate.

(7) The touch display according to any of (1)-(6), further comprises:
a voltage supplying section which is connected with the shielding circuit layer and the touch-sensitive layer, for supplying the same voltage for the shielding circuit layer and the touch-sensitive layer.

(8) An electronic apparatus, comprising the touch display according to any of (1)-(7).

The foregoing description is only the specific implementation of the present invention, rather than limit of the protection scope of the present invention, and any change or alteration that can be readily contemplated by those skilled in the art within the technical scope disclosed by the present invention falls into the protection scope of the present invention. As a result, the protection scope of the present invention shall be defined by the claims.

What is claimed is:

1. A touch display, comprises:
a display device;
a touch device, positioned on a display surface side of the display device, and the touch display comprising a touch-sensitive layer;
a shielding circuit layer, disposed between the touch-sensitive layer and the display device; and
a transparent insulating layer, disposed between the touch-sensitive layer and the shielding circuit layer,
wherein the shielding circuit layer and the touch-sensitive layer are equipotential, and
wherein the shielding circuit layer and the touch-sensitive layer are electrically connected with each other by a via penetrating the transparent insulating layer.

2. The touch display according to claim 1, wherein the touch-sensitive layer and the shielding circuit layer are transparent conductive layers.

3. The touch display according to claim 2, wherein the transparent conductive layers are indium tin oxide layers, or indium zinc oxide layers.

4. The touch display according to claim 1, wherein the display device comprises a counter substrate and an array substrate, and the touch-sensitive layer, the shielding circuit layer and the transparent insulating layer are disposed on the counter substrate.

5. The touch display according to claim 1, wherein the display device is a liquid crystal display panel, and the counter substrate is a color filter substrate.

6. The touch display according to claim 1, further comprises:
 a voltage supplying section which is connected with the shielding circuit layer and the touch-sensitive layer, for supplying the same voltage for the shielding circuit layer and the touch-sensitive layer.

7. An electronic apparatus, comprising the touch display according to claim 1.

* * * * *